[19] US008169669B2

United States Patent
Yoshida et al.

(10) Patent No.: US 8,169,669 B2
(45) Date of Patent: May 1, 2012

(54) SCANNER DEVICE

(75) Inventors: Shoji Yoshida, Kahoku (JP); Hideaki Shibata, Kahoku (JP); Yasuhiro Matsuda, Kahoku (JP); Masaaki Yamashita, Kahoku (JP)

(73) Assignee: PFU Limited, Ishikawa (JP)

( * ) Notice: Subject to any disclaimer, the term of this patent is extended or adjusted under 35 U.S.C. 154(b) by 370 days.

(21) Appl. No.: 12/536,550

(22) Filed: Aug. 6, 2009

(65) Prior Publication Data

US 2010/0053701 A1 Mar. 4, 2010

(30) Foreign Application Priority Data

Sep. 3, 2008 (JP) ................................. 2008-226101

(51) Int. Cl.
*H04N 1/04* (2006.01)
*H04N 1/00* (2006.01)

(52) U.S. Cl. ........ 358/471; 358/400; 358/474; 358/496; 358/498

(58) Field of Classification Search .................. 358/400, 358/474, 471, 496, 498; 399/380; 250/239
See application file for complete search history.

(56) References Cited

U.S. PATENT DOCUMENTS

| 5,382,998 | A | * | 1/1995 | Shida et al. | ...................... | 355/50 |
| 6,205,302 | B1 | * | 3/2001 | Yokota | ............................. | 399/92 |
| 6,633,414 | B1 | * | 10/2003 | Matsuda et al. | .............. | 358/474 |
| 6,961,152 | B1 | * | 11/2005 | Watanabe et al. | ............. | 358/296 |
| 7,246,963 | B2 | * | 7/2007 | Nishimura | .................... | 400/692 |
| 7,290,952 | B2 | * | 11/2007 | Kagami | ......................... | 400/693 |
| 7,627,967 | B1 | * | 12/2009 | Torvik | ....................... | 40/124.16 |
| D609,711 | S | * | 2/2010 | Kuroda et al. | ............... | D14/453 |
| D610,147 | S | * | 2/2010 | Kuroda et al. | ............... | D14/422 |
| D610,148 | S | * | 2/2010 | Kuroda et al. | ............... | D14/422 |
| D610,152 | S | * | 2/2010 | Kuroda et al. | ............... | D14/453 |
| D610,154 | S | * | 2/2010 | Kuroda et al. | ............... | D14/453 |
| D610,155 | S | * | 2/2010 | Kuroda et al. | ............... | D14/453 |
| D616,889 | S | * | 6/2010 | Kuroda et al. | ............... | D14/422 |
| 2006/0104662 | A1 | * | 5/2006 | Kawasumi | ..................... | 399/110 |
| 2010/0060948 | A1 | * | 3/2010 | Yoshida et al. | ............... | 358/474 |

FOREIGN PATENT DOCUMENTS

JP 2004-343271 12/2004

* cited by examiner

*Primary Examiner* — Cheukfan Lee
(74) *Attorney, Agent, or Firm* — Staas & Halsey LLP

(57) ABSTRACT

A scanner device includes a scanner body formed with a document insertion opening and a document ejection opening and is configured so that a document taken in from the document insertion opening is read and then ejected from the document ejection opening. The scanner device further includes an upper surface cover covering the upper surface of the scanner body and a front surface cover covering the front surface of the scanner body. The front cover is connected at a lower end side thereof to the lower front part of the scanner body and connected at an upper end side thereof to pivotably connected to the front end side of the upper surface cover. By opening the front surface cover from the front surface of the scanner body, the upper surface cover and front surface cover form a document ejection tray.

20 Claims, 6 Drawing Sheets

SCANNER DEVICE

CROSS REFERENCE TO RELATED APPLICATION

The present invention contains subject matter related to Japanese Patent Application No. 2008-226101, filed in the Japan Patent Office on Sep. 3, 2008, the entire contents of which being incorporated herein by reference.

BACKGROUND OF THE INVENTION

1. Field of the Invention

The present invention relates to a scanner device configured so that a cover attached pivotably to a scanner body functions as a document ejection tray.

2. Description of the Related Art

A scanner device includes a document insertion opening and a document ejection opening and is configured to read a document inserted from the document insertion opening and then eject the document from the document ejection opening. The scanner device further includes a document feed tray for placing a stock of documents thereon and a document ejection tray for receiving ejected documents and is configured so as to be able to successively feed the topmost documents of the stack placed on the document feed tray into the document insertion opening, read them, and then, after finishing reading them, hold the documents ejected from the document ejection opening on the document ejection tray.

In recent years, in offices and the like, demand has been rising for small desktop scanners suited for the application of being placed on the desks of individuals and digitizing paper documents. In such a desktop scanner, in order to minimize the surface area occupied when not in use, as disclosed in Japanese Unexamined Patent Publication No. 2004-343271, it is preferable for the document feed tray to be made foldable on the scanner body. Further, it is preferable for the document ejection tray as well to be held inside the scanner body when not being used and to be pulled out to the front of the scanner body when used or to fold up on the scanner body.

In a scanner device, in order to enhance operability, operation buttons are arranged on the upper surface of the scanner body. On the other hand, the document ejection opening is often formed at the lower part of the front surface of the scanner device in consideration of the ejected document's handleability. Further, the document ejection tray requires a sufficient length in the document ejection direction to receive and store documents ejected from the document ejection opening. Accordingly, in order to enable a sufficiently long document ejection tray to fold up on the scanner body, it has been necessary to connect the front surface and the upper surface of the scanner body with a smoothly curved surface to form one continuous surface so that the document ejection tray is able to generally extend along the surface of the scanner body when the document ejection tray is folded up on the scanner body, or to make the front surface of the scanner body extending above the document ejection opening a slanting surface so as to substantially eliminate the upper surface and arrange the operation buttons on the slanting surface. This causes constraints in design. Further, it is possible to make the document ejection tray a telescoping type so as to secure a sufficient length for the document ejection tray. However, in this case, there is the problem in that mechanical faults frequently occur.

SUMMARY OF THE INVENTION

Therefore, an object of the present invention is to solve the problems in the above related art and to enable, through a simple structure, securing of a sufficient length of the document ejection tray in the document ejection direction even if the front surface of the scanner body is small.

In order to achieve the above object, according to the present invention, there is provided a scanner device including a scanner body having a document insertion opening formed at the upper rear part and a document ejection opening formed at a lower front part, and configured so that a document taken in from the document insertion opening is read and then ejected from the document ejection opening, in which scanner device further includes an upper surface cover arranged so as to cover the upper surface of the scanner body and a front surface cover arranged so as to cover the front surface of the scanner body, the front surface cover being connected at a lower end side thereof to a lower front part of the scanner body so that the front surface cover can open and close with respect to the front surface of the scanner body and connected at an upper end side thereof to a front end side of the upper surface cover so as to be pivotable, the upper surface cover and the front surface cover being separated from the upper surface and front surface of the scanner body by opening the front surface cover in a direction away from the front surface of the scanner body, thereby forming a document ejection tray receiving a document ejected from the document ejection opening.

In the above scanner device, the front surface cover covering the front surface of the scanner body and the upper surface cover covering the upper surface of the scanner body are pivotably connected to each other and configured to form a document ejection tray by opening the front surface cover from the front surface of the scanner body. Therefore, it is sufficient to combine the lengths of the front surface cover and the upper surface cover to secure a document ejection direction length necessary for a document ejection tray. A sufficient length of the document ejection tray in the document ejection direction can be secured even when the height of the front surface cover is made low, thereby improving design freedom. Further, because a telescoping type structure is not adopted for the document ejection tray, the structure is simple, and the reduction of faults is possible.

The scanner device preferably further includes a document feed tray pivotably attached to the upper rear part of the scanner body and functioning as an external cover when the document feed tray is folded up.

Further, in the above scanner device, preferably the front surface cover covers only the portion of the front surface of the scanner body above the ejection opening and has an arm part connecting the lower front part of the scanner body and the lower end part of the front surface cover, the front surface cover configured to be moved to a position where the front surface cover can receive a document ejected from the document ejection opening when the front surface cover is opened from the front surface of the scanner body so that the upper surface cover and the front surface cover form the document ejection tray. If this kind of structure is used, when the front surface cover is opened from the scanner body so that the front surface cover and the upper surface cover form the document ejection tray, not only can the document ejected from the document ejection opening be received by the document ejection tray, but even when the front surface of the scanner body is covered by the front surface cover, a document can be ejected from the document ejection opening and therefore a scanner device can be used in a compact form under an environment not requiring a document ejection tray.

In the above scanner device, preferably the lower end part of the front surface cover is connected to the scanner body so as to be pivotable about a cover support portion positioned at the lower front part of the scanner body.

In the above scanner device, preferably, when the upper surface cover is arranged so as to cover the upper surface, the surface of the upper surface cover positioned at the upper side has the same outward appearance as the upper surface of the scanner body.

Further, preferably operation buttons are provided on the upper surface of the scanner body and the upper surface cover has an operation button window part at the portion covering the top of the operation buttons of the upper surface when the upper surface cover is arranged so as to cover the upper surface, so that the operation buttons can be operated even when the upper surface cover is arranged so as to cover the upper surface.

According to the present invention, it is sufficient to combine the lengths of the front surface cover and the upper surface cover to secure the necessary length for a document ejection tray. Accordingly, even if the height of the front surface portion is low when, for example, the scanner body is formed into a shape having a polygonal shape when seen from the side, the document ejection direction length of the document ejection tray can be sufficiently secured, and design freedom of the scanner device can be raised.

BRIEF DESCRIPTION OF THE DRAWINGS

These and other objects, features, and advantages of the present invention will be described in more detail below based on preferred embodiments of the present invention with reference to the accompanying drawings, wherein.

DESCRIPTION OF THE PREFERRED EMBODIMENTS

Figure 1:
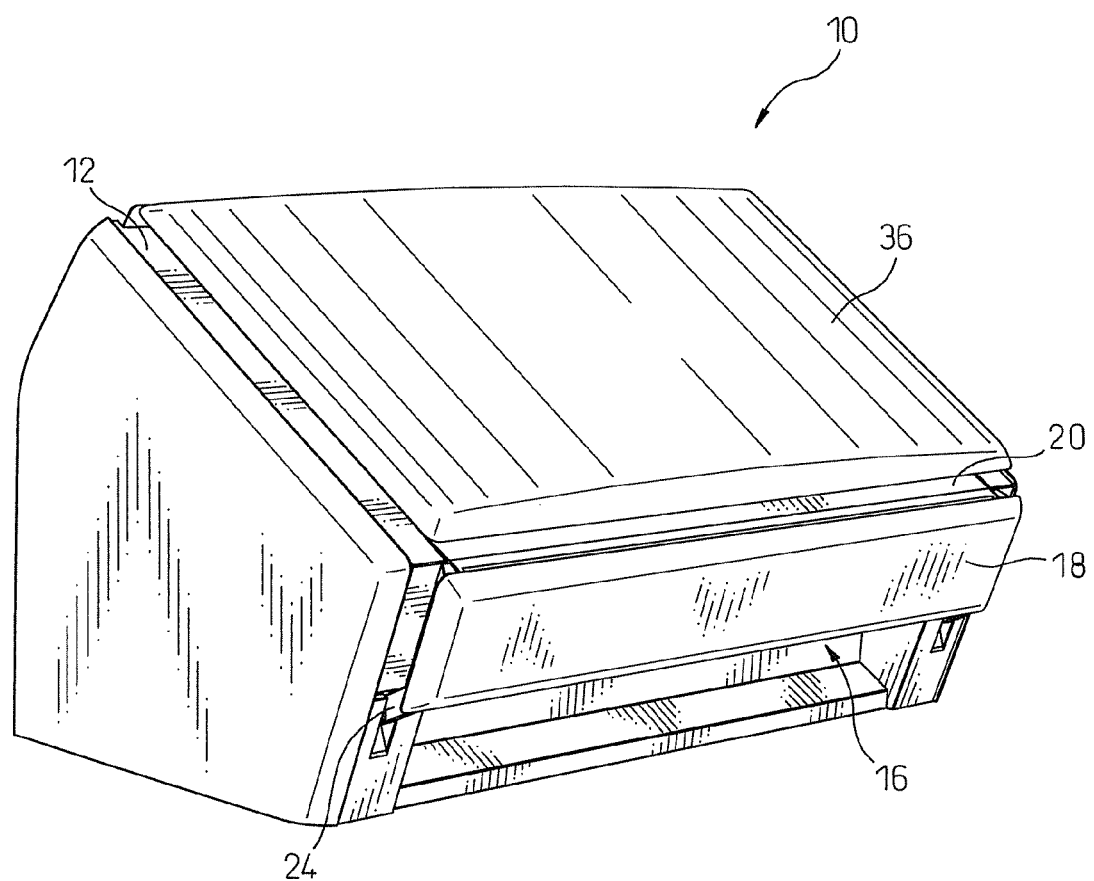
FIG. 1 is a perspective view of a scanner device according to a first embodiment of the present invention in a state where a document feed tray and a document ejection tray are closed.

Preferred embodiments of a scanner device according to the present invention will be described below with reference to the accompanying drawings.

First, referring to FIGS. 1 to 7, a scanner device 10 according to a first embodiment of the present invention will be described. Scanner device 10 is a desktop type designed for use on the top of an office desk or the like and includes a generally pentagonal prism-shaped scanner body 12 having a pentagonal side surface. A document insertion opening 14 is formed at the upper rear part of scanner body 12, while a document ejection opening 16 is formed at the lower front part of scanner body 12. A document taken in from document insertion opening 14 is read and then ejected from document ejection opening 16.

Further, scanner device 10 includes a front surface cover 18 covering the front surface of scanner body 12 and an upper surface cover 20 covering the upper surface of scanner body 12.

Figure 3:
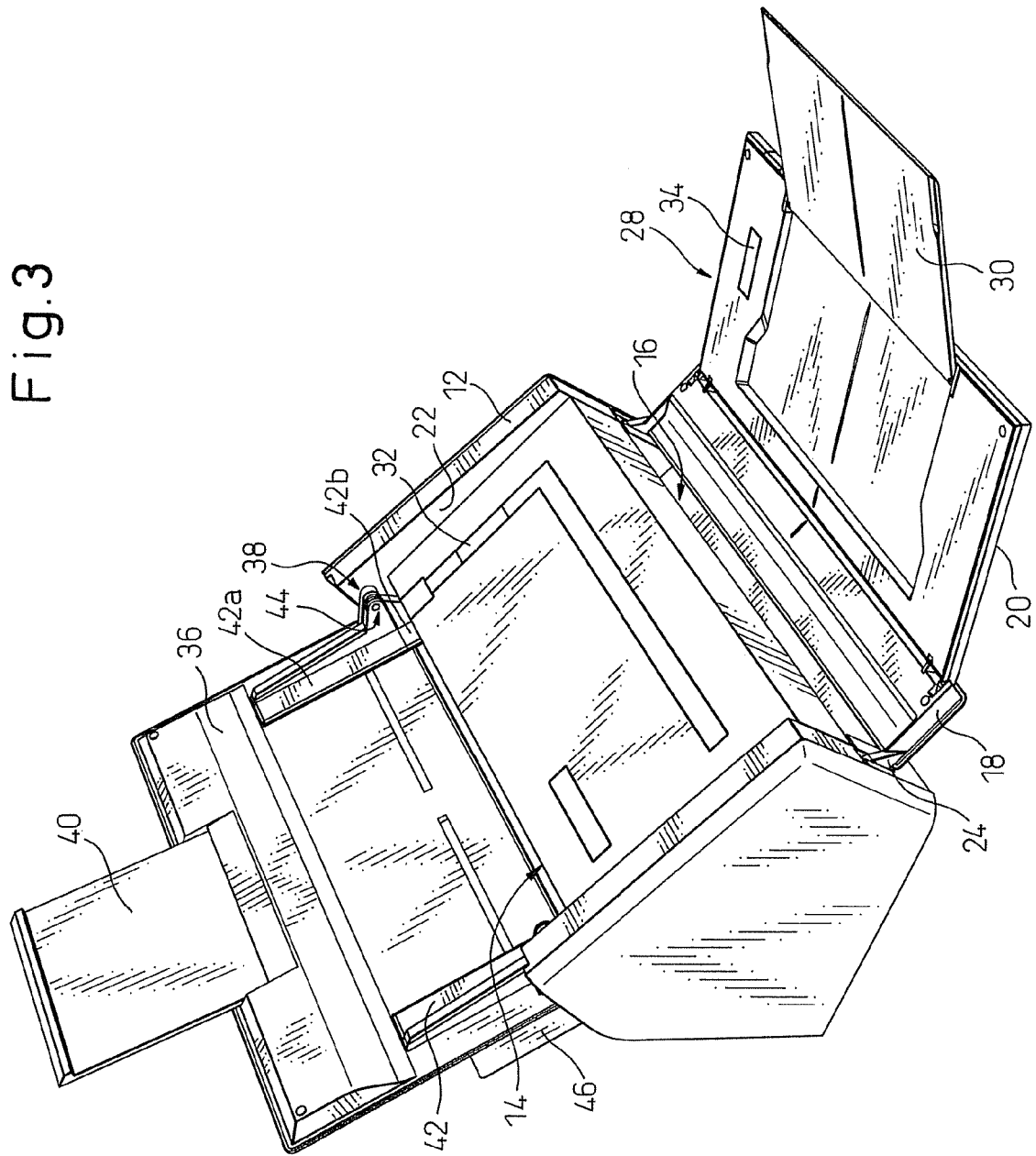
FIG. 3 is a perspective view of the scanner device of FIG. 1 in a state where the document feed tray and document ejection tray are opened.
Figure 4:
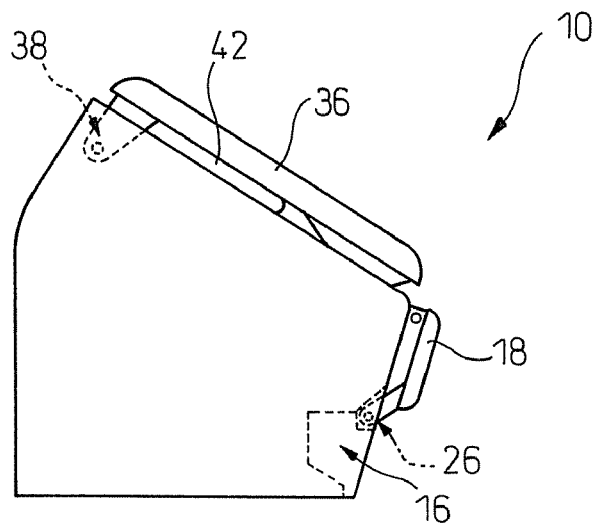
FIG. 4 is a side view of the scanner device in the state shown in FIG. 1.

Front surface cover 18 is arranged so as to cover only the portion of the front surface of scanner body 12 above document ejection opening 16 as shown in FIG. 1, while upper surface cover 20 is arranged so as to be held in a recess 22 formed at the center part of the upper surface of scanner body 12 as shown in FIG. 3 and substantially completely covers the bottom surface of recess 12 of the upper surface of scanner body 12. Note that, front surface cove 18 uses a magnet, latch, or other temporary holding mechanism (not shown) to temporarily hold the covered state of the front surface of scanner body 12.

Arms 24 extend from the two sides of the lower end part of front surface cover 18. These arms 24 are attached near document ejection opening 16 of scanner body 12 so as to be pivotable about cover support portions 26. Cover support portions 26 may be configured by, for example, the combinations of cover pivot shafts provided near document ejection opening 16 of scanner body 12 and cover pivot shaft holes formed at arms 24 of front surface cover 18 and in which the cover pivot shafts of scanner body 12 are inserted. They may also be configured by the combination of cover pivot shafts protruding to the sides from arms 24 of the two sides of front surface cover 18 and cover pivot shaft holes formed near the document ejection opening 16 of scanner body 12 and in which the cover pivot shafts of arms 24 of front surface cover 18 are inserted. It is sufficient for cover support portions 26 to connect the lower end part of front surface cover 18 and the lower front part of scanner body 12 so as to be pivotable, and configuration by any other structure is also possible.

Figure 5:
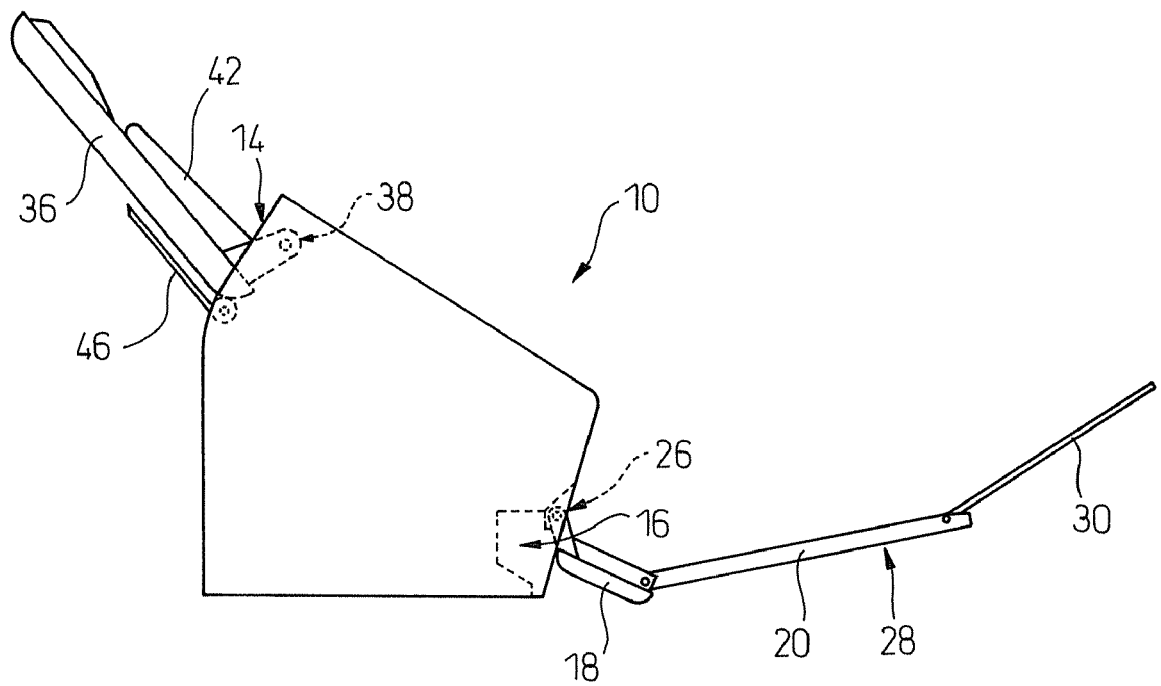
FIG. 5 is a side view of the scanner device in the state shown in FIG. 3.

The lengths of arms 24 of front surface cover 18 are determined so that, when front surface cover 18 is pivoted in a direction away from scanner body 12 about cover support portions 26 to open front surface cover 18 from a state where the front surface of scanner body 12 has been covered, as shown in FIGS. 3 and 5, front surface cover 18 is allowed to be lowered to a position where it can receive a document ejected from document ejection opening 16 of scanner body 12.

Further, front surface cover 18 and upper surface cover 20 are pivotably connected to each other at the area where they are adjacent to each other, that is, at the upper end side of front surface cover 18 and the front end side of upper surface cover 20, so that front surface cover 18 and upper surface cover 20 are separated from the front surface and upper surface of scanner body 12, respectively, by pivoting front surface cover 18 about cover support portions 26, to form, as shown in FIG. 1, a document ejection tray 28 for receiving a document ejected from document ejection opening 16.

As shown in FIG. 3, it is also possible to further pivotably attach a supplementary cover 30 to document insertion opening 14 side of the inner side of upper surface cover 20 and pivot supplementary cover 30 from upper surface cover 20 and further extend document ejection tray 28 when opening front surface cover 18 and upper surface cover 20 from scanner body 12 to form document ejection tray 28.

At the bottom surface of recess 22 of the upper surface of scanner body 12, there are provided operation buttons 32 for operating scanner device 10 such as a scan button for initiating reading. Further, at upper surface cover 20, there is provided an operation button window 34 at a position covering the area where operation buttons 32 are provided when arranging upper surface cover 20 to cover the upper surface of scanner body 12, so that operation buttons 32 can be operated through operation button window 34 even in a state when the upper surface of scanner body 12 is covered by upper surface cover 20. Operation button window 34 may be covered by a transparent, flexible film so as to enable operation buttons 32 to be visually recognized and operation buttons 32 to be operated.

Figure 2:
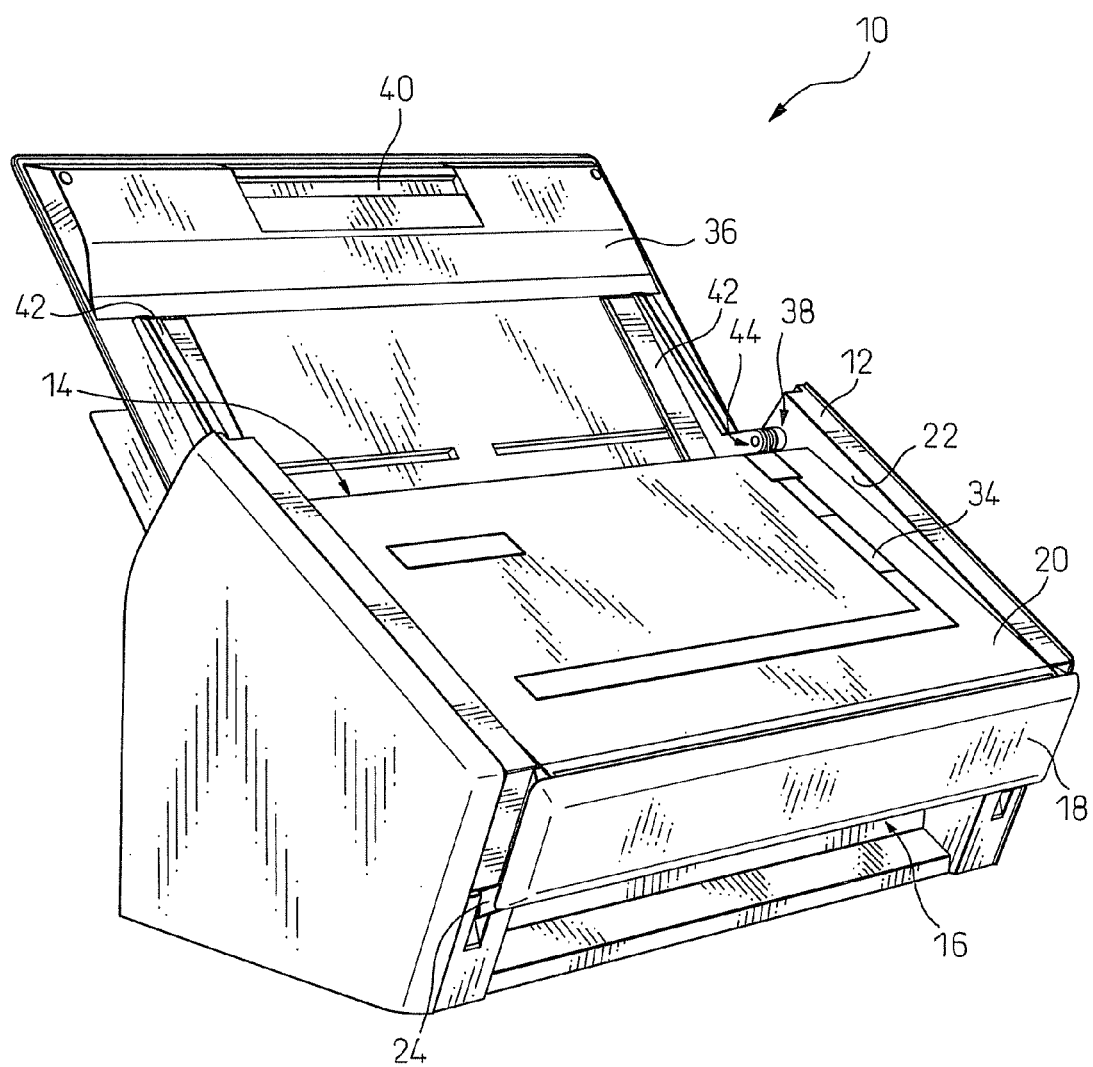
FIG. 2 is a perspective view of the scanner device of FIG. 1 in a state where the document feed tray is opened and the document ejection tray is closed.

Note that, as will be understood from comparing FIGS. 2 and 3, the surface of upper surface cover 20 facing the upper side when document ejection tray 16 is closed and upper surface cover 20 is held inside recess 22 of the upper surface of scanner body 12 and the bottom surface of recess 22 of the upper surface of scanner body 12 have the same design. By using such a configuration, scanner device 10 can be made to have the same outward appearance both when scanner device 10 is used in a state where document ejection tray 28 is folded up and when scanner device 10 is used in a state where document ejection tray 28 is opened up, thereby allowing an increase in design uniformity.

Near document insertion opening 14 formed at the upper rear part of scanner body 12, there is attached a document feed tray 36 for placing thereon a document to be inserted into document insertion opening 14 so as to be pivotable about document feed tray support portions 38, so that, when closed so as to be folded toward scanner body 12, document feed tray 36 functions as an external cover for scanner body 12. Document feed tray support portions 38, for example, may also be configured by the combination of document feed tray pivot shafts protruding to the lateral internal sides from the two sides of scanner body 12 near document insertion opening 14 and document feed tray pivot shaft holes formed at the two sides of document feed tray 36 and in which the document feed tray pivot shafts of scanner body 12 are inserted, or may also be configured by the combination of document feed tray pivot shafts protruding toward the lateral outer sides from the two sides of document feed tray 36 and document feed tray pivot shaft holes formed at the two sides of scanner body 12 near document insertion opening 14 and in which document feed tray pivot shafts of document feed tray 36 are inserted. It is sufficient for document feed tray support portions 38 to connect scanner body 12 and document feed tray 36 so as to be pivotable, and configuration by any other structure is also possible.

Figure 6:
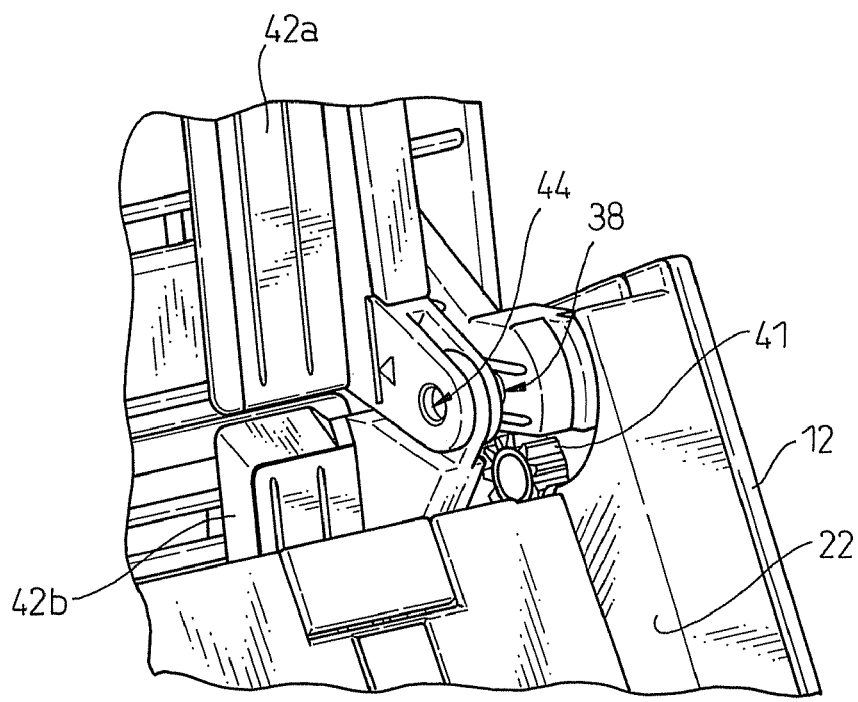
FIG. 6 is an enlarged view of the vicinity of a document feed tray support portion of the scanner device in the state shown in FIG. 3.
Figure 7:
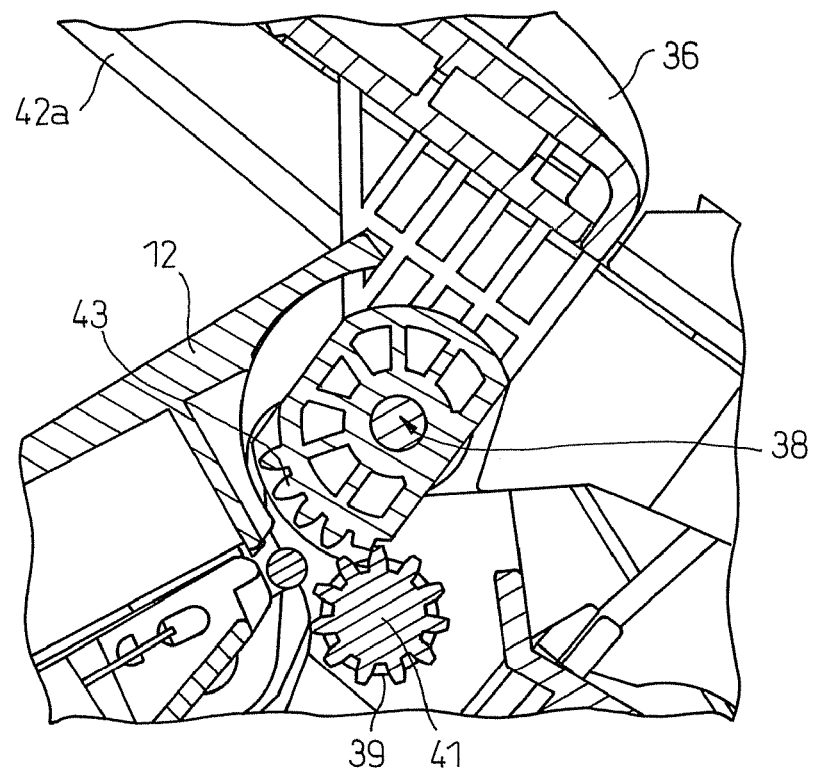
FIG. 7 is a cross-sectional view showing a detailed structure of the document feed tray support portion of FIG. 6.

Further, resistance may be given to the pivoting operation of document feed tray support portions 38 to slowly pivot document feed tray 36 and thereby give a sense of high quality to the operation. For example, as shown in FIGS. 6 and 7, a gear 41 pivotably attached to scanner body 12 through a rotary damper 39 may be engaged with a gear 43 provided at document feed tray 36 so that rotary damper 39 gives resistance to the pivoting operation of document feed tray 36 about document feed tray support portions 38, thereby making document feed tray 36 slowly pivot.

A document feed tray extension plate 40 is telescopically held in the end edge of document feed tray 36 of the side opposite to document feed tray support portion 38, so that document feed tray extension plate 40 can be pulled out from document feed tray 36 to thereby extend the length of document feed tray in the document insertion direction when document feed tray 36 is pivoted in a direction away from scanner body 12 and opened.

Further, document feed tray 36 is provided with two document guides 42 slidable in the horizontal direction in FIGS. 2 and 3. Document guides 42 are slid in the horizontal direction (the width direction of document feed tray 36) to contact the two sides of a document and suppress movement of the document in the lateral direction so as to suitably guide the document to document insertion opening 14. More particularly, each document guide 42, as most clearly seen in FIG. 6, includes a first document guide part 42a attached on document feed tray 36 so as to be slidable in the horizontal direction, and a second document guide part 42b attached near document insertion opening 14 of scanner body 12 so as to be slidable in the horizontal direction and extending at least partially to within document insertion opening 14. First document guide part 42a is connected with second document guide part 42b so as to be pivotable about a guide support portion 44 and can be moved in the horizontal direction along with second document guide part 42b.

By using such a configuration, a document on document feed tray 36 can be accurately guided up to document insertion opening 14 and the document guide portions near document insertion opening 14 can be prevented from interfering with scanner body 12 and hindering the pivoting of document feed tray 36 when document feed tray 36 is folded up on scanner body 12.

Note that, as shown in FIG. 2, recess 22 provided on the upper surface of scanner body 12 is formed so that space above upper surface cover 20 can be secured at least at the rear side part even when upper surface cover 20 is arranged and held in recess 22 of the upper surface of scanner body 12. Due to this, when document feed tray 36 is folded up onto scanner body 12 in a state where upper surface cover 20 is held inside recess 22 of the upper surface of scanner body 12, first document guide parts 42a of document feed tray 36 can be accommodated above upper surface cover 20 and, as shown in FIG. 1, the two sides of document feed tray 36 can be made to closely contact the two sides of the upper surface of scanner body 12.

Further, when document feed tray 36 is folded up onto scanner body 12 and closed, document insertion opening 14 is opened to the outside. Therefore, in order to prevent dust or other foreign objects from entering document insertion opening 14 during non-use, it is preferable to provide a document insertion opening cover 46 pivotable with respect to scanner body 12 near document insertion opening 14 of scanner body 12 so as to be able to close document insertion opening 14 when document feed tray 36 is in a closed state.

Next, the operation of scanner device 10 shown in FIGS. 1 to 7 will be described below.

When not in used, document feed tray 36, document ejection tray 28, and document insertion opening cover 46 are folded up in a compact state as shown in FIG. 1. When opening document insertion opening cover 46 from this state and, further, when pivoting document feed tray 36 in a direction away from scanner body 12 to open it, as shown in FIG. 2, upper surface cover 20 is exposed. If necessary, document feed tray extension plate 40 may be pulled out from the end edge (upper end edge) of document feed tray 36 opposite to document feed tray support portions 38 so as to extend document feed tray 36 and be able to place a longer document on document feed tray 36.

Since document ejection opening 16 is not covered by front surface cover 18, even in this state, by pressing the scan button of operation buttons 32 through operation button window 34 of upper surface cover 20, the reading operation can be begun, thereby taking the document placed on document feed tray 36 into scanner body 12 from document insertion opening 14 and then ejecting the read document from document ejection opening 16. Note that, in this state, as there is no document ejection tray 28, it is necessary to secure space for a document to be ejected outside of document ejection opening 16.

When opening front surface cover 18 in a direction away from the front surface of scanner body 12 from the state shown in FIG. 2, upper surface cover 20 is also separated from scanner body 12 along with front surface cover 18 to thereby form document ejection tray 28 as shown in FIG. 3. Front surface cover 18 is connected to the lower front part of scanner body 12 through arms 24. Therefore, when pivoting front surface cover 18 about cover support points 26, as shown in FIG. 1, front surface cover 18 moves down until a position where it can receive a document ejected from document ejection opening 16, thereby enabling a document ejected from document ejection opening 16 to be received on document ejection tray 28. If necessary, supplementary cover 30 held in the inner side of upper surface cover 20 may be pivoted with respect to upper surface cover 20 and opened so as to extend document ejection tray 28 to be able receive a longer document.

Note that, the upper side surface of upper surface cover 20 when upper surface cover 20 is folded up onto scanner body 12 has the same design as the bottom surface of recess 22 of the upper surface of scanner body 12. Therefore, even if upper surface cover 20 is removed from the upper surface of scanner body 12 in order to form document ejection tray 28, the outside appearance does not change from when upper surface cover 20 covers the upper surface of scanner body 12 and therefore a sense of design uniformity is achieved.

Figure 8:
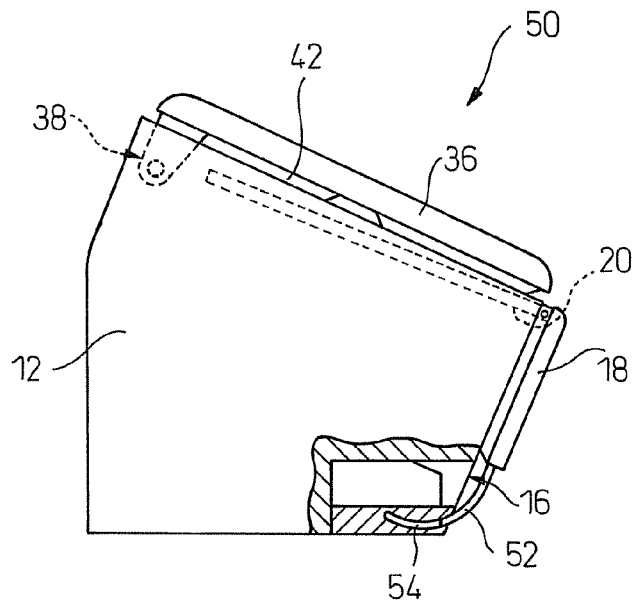
FIG. 8 is a partial cross-sectional side view of a scanner device according to a second embodiment of the present invention in a state where a document feed tray and a document ejection tray are closed.
Figure 9:
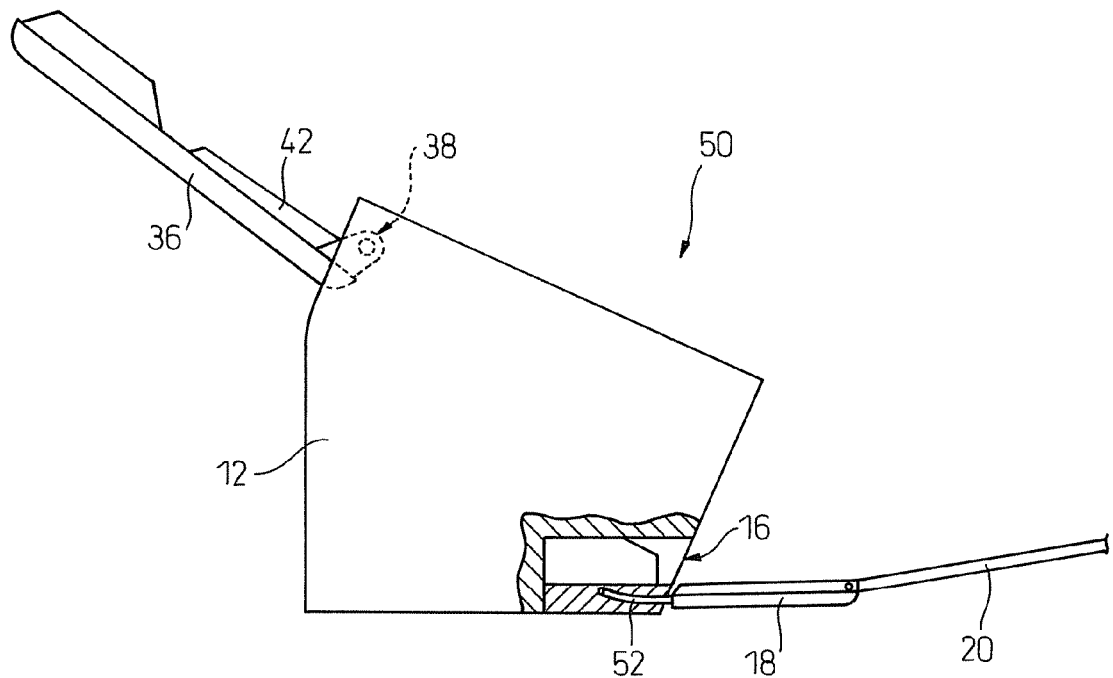
FIG. 9 is a partial cross-sectional side view of the scanner device of FIG. 8 in a state where the document feed tray and document ejection tray are opened.

Next, referring to FIGS. 8 and 9, a scanner device 50 according to a second embodiment of the present invention will be described below. In FIGS. 8 and 9, parts common to the first embodiment are denoted by the same reference numerals.

Scanner device 50 according to the second embodiment differs from scanner device 10 according to the first embodiment with respect to the connection mechanism connecting the lower front part of scanner body 12 to the lower end part of front surface cover 18. In scanner device 10 according to the first embodiment, front surface cover 18 is attached to the lower front part of scanner body 12 through arms 24 extending from the lower end part of front surface cover 18 so as to be pivotable about cover support portions 26, while in scanner device 50 according to the second embodiment, as shown in FIGS. 8 and 9, arc shaped arms 52 extending from the lower end part of front surface cover 18 are slidably received in arm receiving holes 54, which are formed below document ejection opening 16 of scanner body 12 and extend in arc shape, thereby connecting front surface cover 18 to scanner body 12 so that, by sliding arms 52 of front surface cover 18 back and forth in arm holding holes 54, front surface cover 18 can be opened with respect to the front surface of scanner body 12. Since the rest of the structure of scanner 50 according to the second embodiment is the same as scanner device 10 according to the first embodiment, it is not explained here in detail. Scanner device 50 according to the second embodiment having such a structure can achieve the same action and effects as the first embodiment.

Although the scanner device according to the present invention has been described based on the illustrated embodiments, the scanner device according to the present invention is not limited to the illustrated embodiments. For example, in the illustrated embodiments, scanner body 12 of the scanner device 10 or 50 has a pentagonal prism shape when seen from the side. However, scanner body 12 may have any shape and be made into polygonal shapes other than a pentagonal prism shape, for example, a triangular prism shape or a rectangular shape. Further, front surface cover 18 covers only the portion above document ejection opening 16 of scanner body 12. However, front surface cover 18 may cover the entirety of the front surface of scanner body 12 including document ejection opening 16.

The invention claimed is:

1. A scanner device comprising a scanner body having a document insertion opening formed at the upper rear part and a document ejection opening formed at a lower front part, and configured so that a document taken in from the document insertion opening is read and then ejected from the document ejection opening, wherein said scanner device further comprises an upper surface cover arranged so as to cover the upper surface of the scanner body and a front surface cover arranged so as to cover the front surface of the scanner body, said front surface cover being connected at a lower end side thereof to a lower front part of the scanner body so that the front surface cover can open and close with respect to the front surface of the scanner body and connected at an upper end side thereof to a front end side of the upper surface cover so as to be pivotable, said upper surface cover and said front surface cover being separated from the upper surface and front surface of the scanner body by opening the front surface cover in a direction away from the front surface of the scanner body, thereby forming a document ejection tray receiving a document ejected from the document ejection opening.

2. The scanner device according to claim 1, wherein the scanner device further comprises a document feed tray pivotably attached to the upper rear part of the scanner body and functioning as an external cover when the document feed tray is folded up.

3. The scanner device according to claim 2, wherein the front surface cover covers only the portion of the front surface of the scanner body above the ejection opening and has an arm part connecting the lower front part of the scanner body and the lower end part of the front surface cover, said front surface cover configured to be moved to a position where the front surface cover can receive a document ejected from the document ejection opening when the front surface cover is opened from the front surface of the scanner body so that the upper surface cover and the front surface cover form the document ejection tray.

4. The scanner device according to claim 3, wherein the lower end part of the front surface cover is connected to the scanner body so as to be pivotable about a cover support portion positioned at the lower front part of the scanner body.

5. The scanner device according to claim 4, wherein when the upper surface cover is arranged so as to cover the upper surface, the surface of the upper surface cover positioned at the upper side has the same outward appearance as the upper surface of the scanner body.

6. The scanner device according to claim 3, wherein when the upper surface cover is arranged so as to cover the upper surface, the surface of the upper surface cover positioned at the upper side has the same outward appearance as the upper surface of the scanner body.

7. The scanner device according to claim 3, wherein operation buttons are provided on the upper surface of the scanner body and the upper surface cover has an operation button window part at the portion covering the top of the operation buttons of the upper surface when the upper surface cover is arranged so as to cover the upper surface, so that the operation buttons can be operated even when the upper surface cover is arranged so as to cover the upper surface.

8. The scanner device according to claim 2, wherein the lower end part of the front surface cover is connected to the scanner body so as to be pivotable about a cover support portion positioned at the lower front part of the scanner body.

9. The scanner device according to claim 8, wherein when the upper surface cover is arranged so as to cover the upper surface, the surface of the upper surface cover positioned at the upper side has the same outward appearance as the upper surface of the scanner body.

10. The scanner device according to claim 2, wherein when the upper surface cover is arranged so as to cover the upper surface, the surface of the upper surface cover positioned at the upper side has the same outward appearance as the upper surface of the scanner body.

11. The scanner device according to claim 2, wherein operation buttons are provided on the upper surface of the scanner body and the upper surface cover has an operation button window part at the portion covering the top of the operation buttons of the upper surface when the upper surface cover is arranged so as to cover the upper surface, so that the operation buttons can be operated even when the upper surface cover is arranged so as to cover the upper surface.

12. The scanner device according to claim 1, wherein the front surface cover covers only the portion of the front surface of the scanner body above the ejection opening and has an arm part connecting the lower front part of the scanner body and the lower end part of the front surface cover, said front surface cover configured to be moved to a position where the front surface cover can receive a document ejected from the document ejection opening when the front surface cover is opened from the front surface of the scanner body so that the upper surface cover and the front surface cover form the document ejection tray.

13. The scanner device according to claim 12, wherein the lower end part of the front surface cover is connected to the scanner body so as to be pivotable about a cover support portion positioned at the lower front part of the scanner body.

14. The scanner device according to claim 13, wherein when the upper surface cover is arranged so as to cover the upper surface, the surface of the upper surface cover positioned at the upper side has the same outward appearance as the upper surface of the scanner body.

15. The scanner device according to claim 12, wherein when the upper surface cover is arranged so as to cover the upper surface, the surface of the upper surface cover positioned at the upper side has the same outward appearance as the upper surface of the scanner body.

16. The scanner device according to claim 12, wherein operation buttons are provided on the upper surface of the scanner body and the upper surface cover has an operation button window part at the portion covering the top of the operation buttons of the upper surface when the upper surface cover is arranged so as to cover the upper surface, so that the operation buttons can be operated even when the upper surface cover is arranged so as to cover the upper surface.

17. The scanner device according to claim 1, wherein the lower end part of the front surface cover is connected to the scanner body so as to be pivotable about a cover support portion positioned at the lower front part of the scanner body.

18. The scanner device according to claim 17, wherein when the upper surface cover is arranged so as to cover the upper surface, the surface of the upper surface cover positioned at the upper side has the same outward appearance as the upper surface of the scanner body.

19. The scanner device according to claim 1, wherein when the upper surface cover is arranged so as to cover the upper surface, the surface of the upper surface cover positioned at the upper side has the same outward appearance as the upper surface of the scanner body.

20. The scanner device according to claim 1, wherein operation buttons are provided on the upper surface of the scanner body and the upper surface cover has an operation button window part at the portion covering the top of the operation buttons of the upper surface when the upper surface cover is arranged so as to cover the upper surface, so that the operation buttons can be operated even when the upper surface cover is arranged so as to cover the upper surface.

* * * * *